(12) United States Patent
Cohen et al.

(10) Patent No.: US 10,200,508 B2
(45) Date of Patent: Feb. 5, 2019

(54) SYSTEM AND METHOD FOR SHARING SPECIAL-PURPOSE PROCESSING RESOURCES

(71) Applicant: Nvidia Corporation, Santa Clara, CA (US)

(72) Inventors: Jonathan Cohen, Ann Arbor, MI (US); Michael Houston, Santa Clara, CA (US); Frank Jargstorff, Oakland, CA (US); Eric Young, Santa Clara, CA (US); Roy Kim, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 609 days.

(21) Appl. No.: 14/149,327

(22) Filed: Jan. 7, 2014

(65) Prior Publication Data

US 2015/0081866 A1    Mar. 19, 2015

Related U.S. Application Data

(60) Provisional application No. 61/878,960, filed on Sep. 17, 2013.

(51) Int. Cl.
*H04L 29/06* (2006.01)
*H04L 29/08* (2006.01)

(52) U.S. Cl.
CPC .............. *H04L 69/03* (2013.01); *H04L 67/02* (2013.01); *H04L 67/1097* (2013.01); *H04L 67/2828* (2013.01); *H04L 67/40* (2013.01)

(58) Field of Classification Search
None
See application file for complete search history.

(56) References Cited

U.S. PATENT DOCUMENTS

| 6,249,879 | B1* | 6/2001 | Walker | G06F 11/1435 |
| | | | | 714/11 |
| 7,865,394 | B1* | 1/2011 | Calloway | G06Q 10/107 |
| | | | | 370/252 |
| 8,752,192 | B2* | 6/2014 | Odaka | G11B 27/034 |
| | | | | 726/2 |
| 2008/0229025 | A1* | 9/2008 | Plamondon | G06F 12/0862 |
| | | | | 711/126 |
| 2009/0307699 | A1* | 12/2009 | Munshi | G06F 9/4843 |
| | | | | 718/102 |
| 2010/0250590 | A1* | 9/2010 | Galvin | G06F 1/3203 |
| | | | | 707/770 |
| 2011/0292058 | A1* | 12/2011 | Herr | G06T 1/60 |
| | | | | 345/520 |

(Continued)

OTHER PUBLICATIONS

Foreign Communication From a Related Counterpart Application, PCT Application No. PCT/US2014/049676; PCT Search Report and Written Opinion dated Oct. 2, 2014; 11 pages.

(Continued)

*Primary Examiner* — Younes Naji

(57) ABSTRACT

A special-purpose processing system, a method of carrying out sharing special-purpose processing resources and a graphics processing system. In one embodiment, the special-purpose processing system includes: (1) a special-purpose processing resource and (2) a Representational State Transfer (ReST) application programming interface operable to process data using the special-purpose processing resource in response to stateless commands based on a standard protocol selected from the group consisting of: (2a) a standard network protocol and (2b) a standard database query protocol.

20 Claims, 5 Drawing Sheets

(56) References Cited

U.S. PATENT DOCUMENTS

| | | | | |
|---|---|---|---|---|
| 2012/0239726 | A1* | 9/2012 | Berfanger | H04L 67/2823 709/203 |
| 2013/0100242 | A1* | 4/2013 | Canitz | G06F 17/30905 348/43 |
| 2013/0132553 | A1* | 5/2013 | Stratton | H04L 41/50 709/223 |
| 2013/0347009 | A1* | 12/2013 | Hall | G06F 9/4482 719/328 |
| 2014/0047236 | A1* | 2/2014 | Russell | G06F 21/6218 713/168 |
| 2014/0129630 | A1* | 5/2014 | Nikain | H04N 21/8133 709/204 |
| 2015/0006318 | A1* | 1/2015 | Thaker | H04L 67/00 705/26.8 |
| 2015/0051921 | A1* | 2/2015 | Tran | G06F 19/322 705/3 |
| 2015/0052205 | A1* | 2/2015 | Svoboda | H04L 51/22 709/206 |

OTHER PUBLICATIONS

Kang, Joon-Myung; IEEE International Conference on Communications 2013: 2nd Workshop on Clouds, Networks and Data Centers—A Holistic Approach Towards an Integrated Service Provider Infrastructure; "Software-Defined Infrastructure and the Future Central Office;" pp. 225-229.

Vijauakumar, Senthilkumar; 2012 IEEE Fifth International Conference on Cloud Computing; "Optimizing Sequence Alignment in Cloud Using Hadoop and MPP Database;" pp. 819-827.

Picresize, http://www.picresize.com/, The Internet's Best Picture Resizing Tool, Jul. 7, 2014, 1 page.

Resizor, http://resizor.com/, On-the-fly image resizing, cropping and hosting with a Rest API, Jul. 7, 2014, 2 pages.

Cloudinary, http://cloudinary.com/, "Image Management in the Cloud," Cloud-based image management & upload, Jul. 7, 2014, 10 pages.

* cited by examiner

SYSTEM AND METHOD FOR SHARING SPECIAL-PURPOSE PROCESSING RESOURCES

CROSS-REFERENCE TO RELATED APPLICATION

This application claims the benefit of U.S. Provisional Application Ser. No. 61/878,960, filed by Cohen, et al., on Sep. 17, 2013, entitled "GPU-Accelerated Image Processing Web Service," commonly assigned with this application and incorporated herein by reference.

TECHNICAL FIELD

This application is directed, in general, to shared processing resources and, more specifically, to a system and method for sharing special-purpose processing resources.

BACKGROUND

As those who surf the Internet know, the World-Wide Web (or simply, the "web") is image-rich. Content delivery (or distribution) networks (CDNs) are responsible for providing web content to a wide array of clients, such as media-center, desktop and laptop personal computers (PCs), tablet computers and smartphones. Not only can the aggregate rate at which CDNs need to serve images be tremendous, but the content they serve often needs to be adapted for use by the client requesting it. Alterations with respect to pixel dimensions, aspect ratios and encoding formats are common, as well as the addition of watermarks or logos). Even common web sites sometimes need to provide multiple versions of content. Today, image alterations for both CDNs and common web sites are typically done a priori and in batches. Fortunately, large, fast file systems have been developed to store and serve multiple versions of substantially the same content.

SUMMARY

One aspect provides a special-purpose processing system. In one embodiment, the special-purpose processing system includes: (1) a special-purpose processing resource and (2) a Representational State Transfer (ReST) application programming interface (API) operable to process data using the special-purpose processing resource in response to stateless commands based on a standard protocol selected from the group consisting of: (2a) a standard network protocol and (2b) a standard database query protocol.

Another aspect provides a method of carrying out special-purpose processing. In one embodiment, the method includes: (1) receiving a stateless command based on a standard protocol selected from the group consisting of: a standard network protocol, and a standard database query protocol into a ReSTful API, the stateless command calling for data to be processed using a special-purpose processing resource, (2) processing the data using the special-purpose processing resource and (3) responding to the stateless command with results of the processing.

Yet another aspect provides a graphics processing system. In one embodiment, the graphics processing system includes: (1) a graphics processing unit (GPU), (2) a network interface and (3) a central processing unit (CPU) coupled to the graphics processing unit and the network interface and operable to enable a ReST API for: (3a) receiving a stateless command based on a standard network protocol and (3b) processing data using the special-purpose processing resource in accordance with the stateless command.

BRIEF DESCRIPTION

Reference is now made to the following descriptions taken in conjunction with the accompanying drawings, in which.

DETAILED DESCRIPTION

As stated above, large, fast file systems have been developed to store and serve multiple versions of substantially the same content. CDNs and web site owners are resigned to bearing the cost of purchasing and operating such file systems. However, it is realized herein that they would avoid such cost were a practical way to exist for altering content in real-time. It is further realized herein that special-purpose processing resources, such as graphics processing units (GPUs), are needed for altering quantities of content at practical speeds in real-time. However, while special-purpose processing resources exist, they currently exist in the context of standalone computer systems, and access is gained to them using special APIs and relatively high-bandwidth buses.

It is realized herein that such special-purpose processing resources can be made more widely available by employing a ReST API architecture (or "ReSTful API") based on a standard protocol employable over a network, such as HyperText Transfer Protocol (HTTP) or to query a database, such as Structured Query Language (SQL). It is further realized herein that using a ReSTful API based on a standard protocol, a special-purpose processing resource can be made available to any node in a computer network or to a database management system (DBMS). It is yet further realized herein that a ReSTful API provides relatively high bandwidth access to special-purpose processing resources that are conventionally optimized for throughput rather than bandwidth. It is still further realized herein that not only alterations to content such as images and videos are possible, but that analyses of such content not involving alteration are also possible. It is yet still further realized that other special-purpose processing resources, such as math processing, signal processing, encoding/decoding, encryption/decryption or massively parallel processing, may likewise be made available to nodes of a network via ReSTful APIs based on standard protocols and brought to bear to process or analyze all manner of data.

Accordingly, introduced herein are various embodiments of a system and method for network-based, special-purpose processing. At a very high level, the systems and methods employ a standard protocol employable over a network, e.g., HTTP, eXtensible Markup Language (XML) Simple Object Access Protocol (SOAP) or Remote Procedure Call (RPC) or to query a database, such as SQL, Data Base Connectivity (DBC) or Virtual FileSystem (VFS), to create a ReSTful API to special-purpose hardware. In certain embodiments, the ReSTful API allows data to be cited, posted, updated, read or deleted using stateless commands (i.e. commands that are self-contained and thus can be interpreted with no further input).

Figure 1:
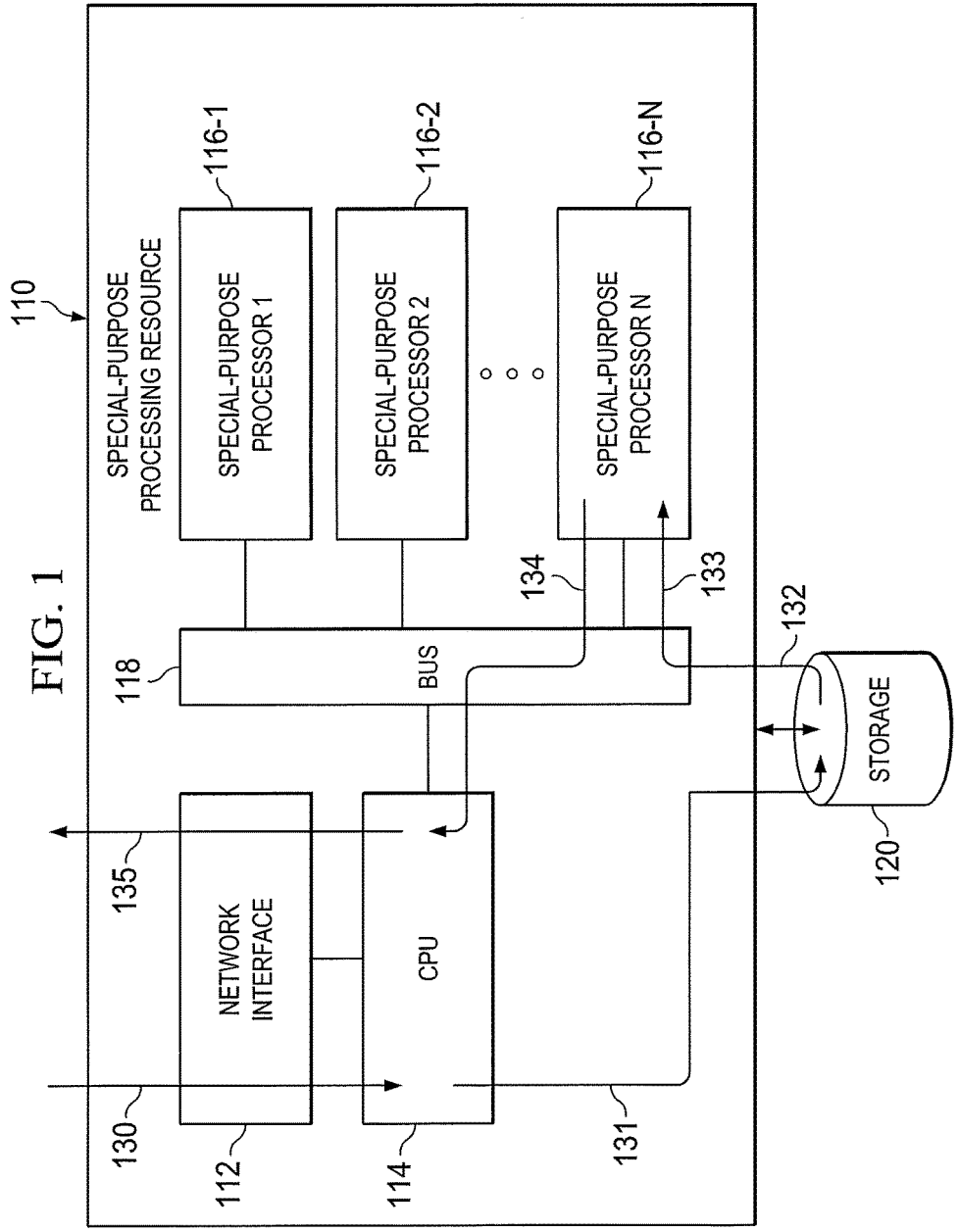
FIG. 1 is a high-level diagram of one embodiment of a special-purpose processing resource.

FIG. 1 is a high-level diagram of one embodiment of a special-purpose processing resource 110. The resource 110 includes a network interface 112. The network interface 112 is operable to provide an interface for the resource 110 to a network, e.g., the Internet. A central processing unit (CPU) 114 is coupled to the network interface 112. The CPU 114 is operable to provide general-purpose processing for the resource 110. In one embodiment, the CPU 114 is has reduced instruction set computer (RISC) architecture. In another embodiment, the CPU 114 has a complex instruction set computer (CISC) architecture.

At least one special-purpose processor 116 is coupled via a bus 118 to the CPU 114. FIG. 1 shows a plurality of such special-purpose processors 116-1, 116-2, . . . , 116-N. In one embodiment, each special-purpose processor 116-1, 116-2, . . . , 116-N is a GPU. In alternative embodiments, each special-purpose processor 116-1, 116-2, . . . , 116-N is a math (e.g., floating-point) coprocessor or a digital signal processor (DSP), encoding or decoding processors, encryption or decryption processors or a massively parallel processor (MPP). In other alternative embodiments, each special-purpose processor 116-1, 116-2, . . . , 116-N is a special-purpose processor of another conventional or later-developed type. For purposes of this disclosure, a "special-purpose processor" is a processor having a design optimized for performing particular types of processing on particular types of data. They are not CPUs, which are optimized for general data processing. Rather, special-purpose processors are typically designed to operate in conjunction with, and not in lieu of, general-purpose processors, such as CPUs. For this reason, special-purpose processors are sometimes referred to as coprocessors or accelerators.

In the illustrated embodiment, the bus 118 is a Peripheral Component Interconnect Express (PCIe) bus. In alternative embodiments, the bus 118 is of any other conventional standard type (e.g., Quick Path Interconnect, or QPI or proprietary or later-developed type.

Storage 120 is coupled to the special-purpose processing resource 110 and operable to store data (e.g., images, audio, video or other data) to be used by the special-purpose processing resource 110 in carrying out its processing. FIG. 1 implies that the storage 120 includes local nonvolatile memory (e.g., one or more hard disk drives), which it may. However, in alternative embodiments, the storage includes volatile memory (e.g., dynamic random-access memory, or DRAM), "cloud" storage (e.g., S3 commercially available from Amazon.com, Incorporated of Seattle, Wash.), distributed storage (e.g., MogileFS) or any other conventional or later-developed data storage means, mechanism or infrastructure.

The special-purpose processing resource 110 is generally operable to receive stateless commands expressed in a standard network or database query protocol requesting some sort of special-purpose processing to be carried out with respect to some sort of data and, in response, invoke one or more of the special-purpose processors 116-1, 116-2, . . . , 116-N to carry out the special-purpose processing and return results of some sort using the standard network or database query protocol. Accordingly, an arrow 130 represents a command incoming from a network (not shown). In one embodiment, the command is expressed in HTTP and is a Request command to resize a stored image to target pixel dimensions. The command contains an indication of the processing to be done either in the name of a file requested or in an argument included as part of the command. For example, target pixel dimensions are specified in the Request command as a folder in which the file is located.

In response, a thread is launched in the CPU 114 in which the command is parsed, including the identity of the data to be processed. In one embodiment, the data is an image having particular pixel dimensions, which may be regarded as original pixel dimensions. Accordingly, a request is made of the storage 120 for the data, as an arrow 131 indicates. The storage 120 returns the data to the special-purpose processing resource 110 as an arrow 132 indicates. In the illustrated embodiment, the data is uploaded to at least one of the special-purpose processors 116-1, 116-2, . . . , 116-N to carry out the special-purpose processing as an arrow 133 indicates. In an alternative embodiment, the CPU 114 receives the data and then uploads it to at least one of the special-purpose processors 116-1, 116-2, . . . , 116-N to carry out the special-purpose processing. In one embodiment, a special-purpose processor 116-N resized the image having the original pixel dimensions to yield the image having the target pixel dimensions. When processing is complete, the data is transmitted via the bus 134 to the CPU 114 as the arrow 134 indicates. Thereafter, the CPU 114 send the data (e.g., the image having the target pixel dimensions) via the network interface 112 to the network (not shown) as the response.

Figure 2:
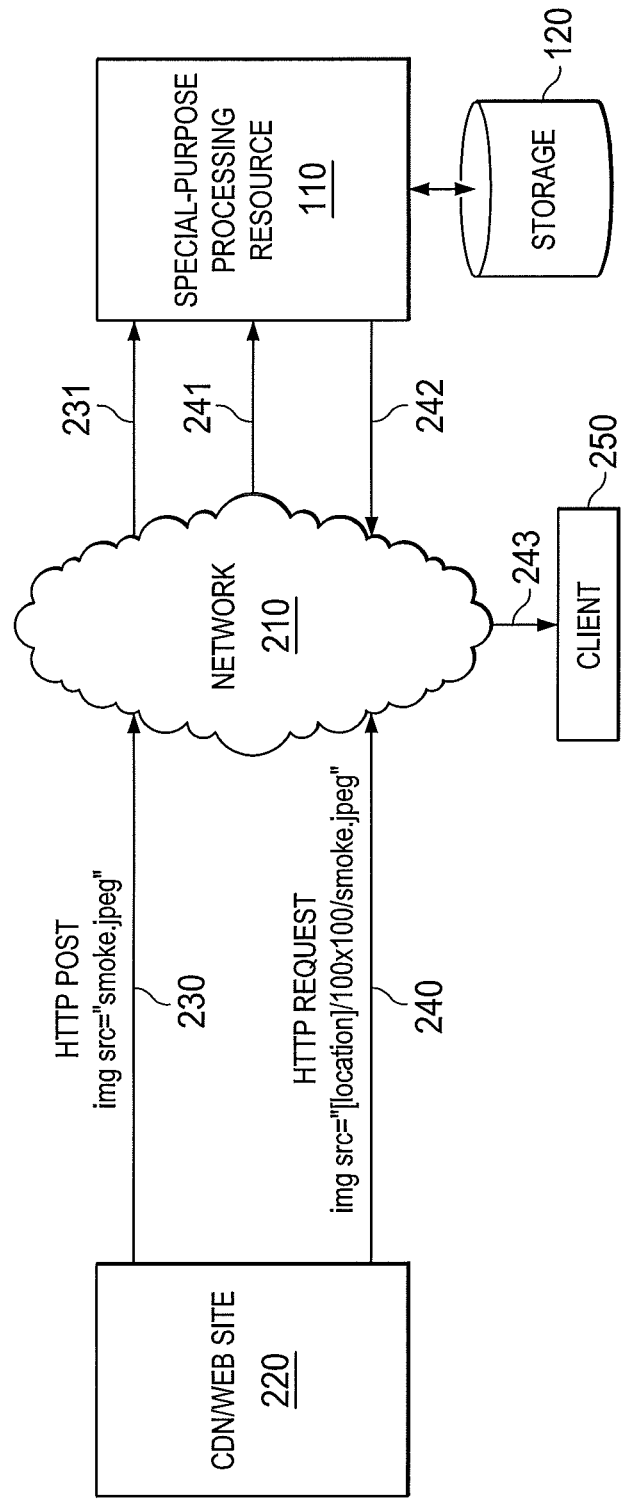
FIG. 2 is a high-level diagram of a first embodiment of a network including a system for sharing special-purpose processing resources.

FIG. 2 is a high-level diagram of a first embodiment of a network 110 (which may be the Internet) including a system for sharing special-purpose processing resources. The system is embodied in an embodiment of the special-purpose processing resource 110. The special-purpose processing resource 110 is operable to receive stateless commands expressed in a standard network protocol and respond to or carry out the stateless commands, which may involve altering or analyzing data (e.g., image, video, audio or other data) referred to in the stateless commands. The storage 120 is operable to store data for subsequent alteration and communication by the special-purpose processing resource 110.

A CDN or web site 220 can initially cause content, such as a file containing an image called "smoke.jpeg," to be stored in the storage 120 by posting it. In the embodiment of FIG. 1, the CDN or web site 220 employs the stateless HTTP POST command to post the content as an arrow 230 indicates. The content travels through the network 110 and into the special-purpose processing resource 110 as an arrow 231 indicates. The special-purpose processing resource 110 then causes the "smoke.jpeg" image file to be stored in the storage 120. At a later time, the CDN or web site 220 employs the stateless HTTP Request command to request a 100×100 pixel version of the "smoke.jpeg" file stored at [location] as an arrow 240 indicates. The special-purpose processing resource 110 receives the Request command as an arrow 241 indicates. The special-purpose processing resource 110 then causes the content to be retrieved from the storage 120 and sent to a special-purpose processor within the special-purpose processing resource 110 for resizing to a 100×100 pixel version. Once resized, the special-purpose processing resource 120 then causes the resized "smoke.jpeg" file to be transmitted toward a client 250 as arrows 242, 243 indicate. The 100×100 pixel "smoke.jpeg" file is ostensibly appropriate for display by the client 250, but was not required to be generated or stored a priori (before they are requested). Instead, the GPU 164 created the 100×100 pixel version of the file on-demand.

Figure 3:
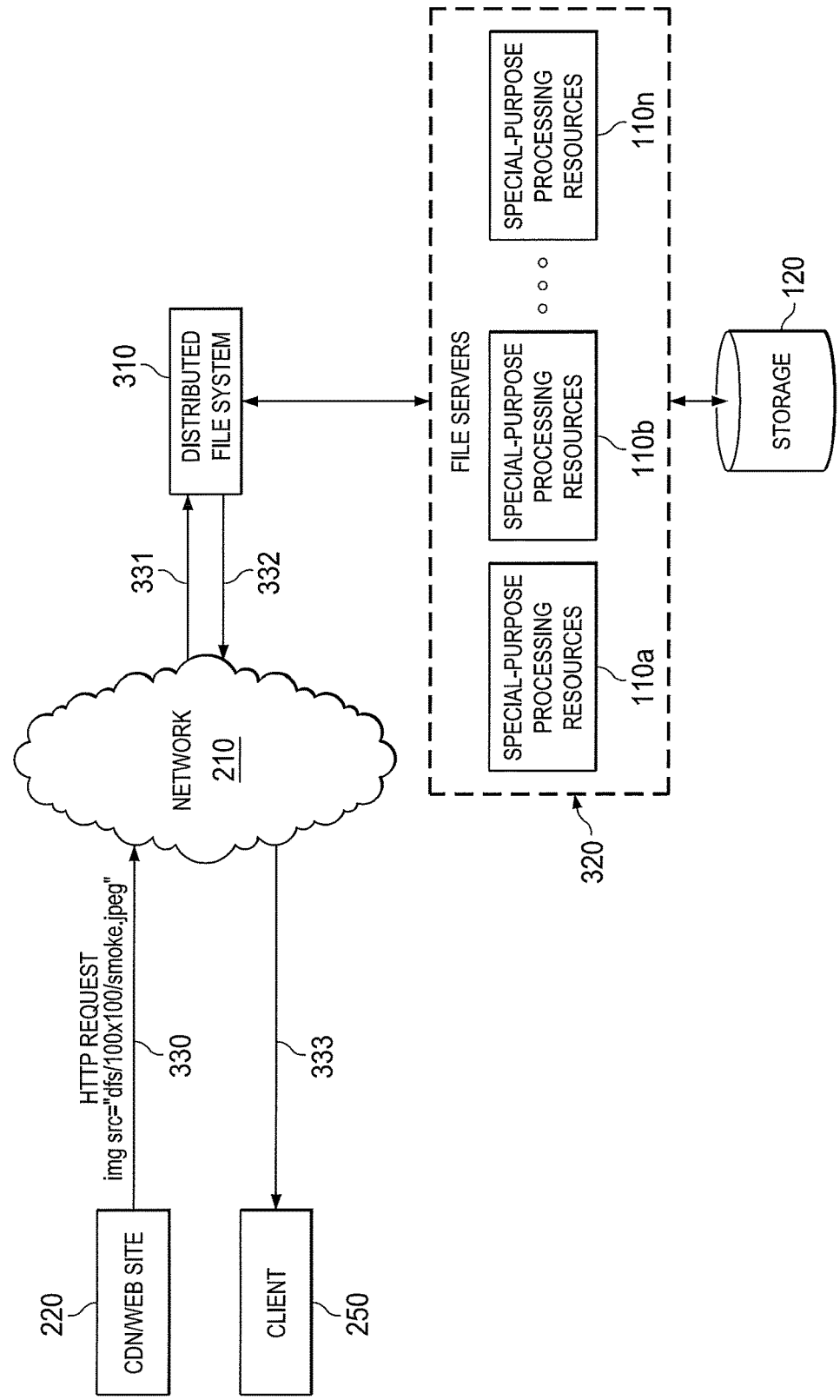
FIG. 3 is a high-level diagram of a second embodiment of a network including a system for sharing special-purpose processing resources.

FIG. 3 is a high-level diagram of a second embodiment of a network including a system for sharing special-purpose processing resources. In the embodiment of FIG. 3, multiple special-purpose processing resources 110*a*, 110*b*, 110*n* function as file servers 320 to a DFS 310. Thus, the special-purpose processing resources 110*a*, 110*b*, . . . , 110*n* are operable to receive stateless commands expressed in a standard database query protocol.

The DFS 310 contains entries to multiple versions of content, and the special-purpose processing resources 110*a*, 110*b*, . . . , 110*n* respond to requests by the DFS 310 for particular ones of the multiple versions by creating it on-demand from original versions stored in the storage 120. In FIG. 2, the CDN or web site 220 employs the stateless HTTP Request command to request a 100×100 pixel version of the "smoke.jpeg" file stored at "dfs" as an arrow 330 indicates. The DFS 310 receives the Request command as an arrow 331 indicates. The DFS 310 issues a query for the specified version of the file from the file servers 320. The query contains an indication of the version either in the filename queried or in an argument included as part of the query. The file servers 320 then cause the content to be retrieved from the storage 120 and sent to a special-purpose processor within one of the special-purpose processing resources 110*a*, 110*b*, . . . , 110*n* for resizing to a 100×100 pixel version. Once resized, the resized "smoke.jpeg" file is transmitted back to the DFS 310, and the DFS 310 causes it to be transmitted toward a client 250 as arrows 332, 333 indicate.

Figure 4:
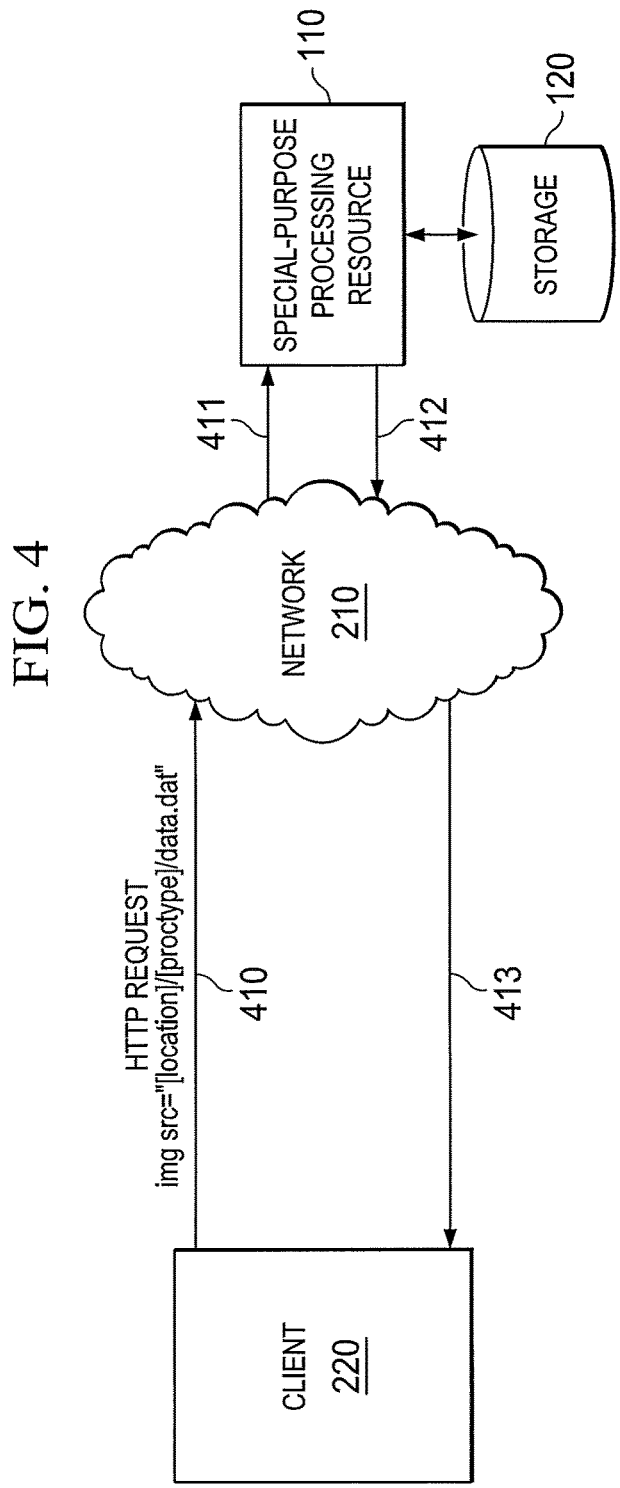
FIG. 4 is a high-level diagram of a third embodiment of a network including a system for sharing special-purpose processing resources.

FIG. 4 is a high-level diagram of a third embodiment of a network including a system for sharing special-purpose processing resources. The embodiment of FIG. 4 provides a general architecture for providing special-purpose data processing to various clients in a network. Accordingly, the client 220 employs the stateless HTTP Request command to request that some type of processing [proctype] be performed with respect to a file "data.dat" file stored at [location] as an arrow 410 indicates. The special-purpose processing resource 110 receives the Request command as an arrow 411 indicates. The special-purpose processing resource 110 then causes the content to be retrieved from the storage 120 and sent to a special-purpose processor in the special-purpose processing resource 110 for processing. The special-purpose processing resource 120 then causes processed data or data reflecting an analysis of "data.dat" to be transmitted back to the client 220 as arrows 412, 413 indicate.

Figure 5:
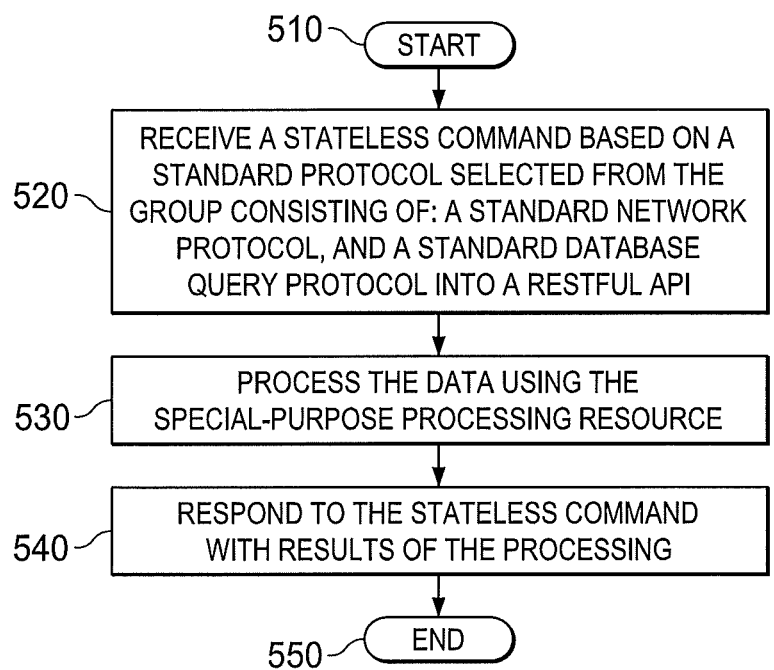
FIG. 5 is a flow diagram of one embodiment of a method of carrying out special-purpose processing.

FIG. 5 is a flow diagram of one embodiment of a method of carrying out special-purpose processing. The method begins in a start step 510. In a step 520, a stateless command based on a standard protocol selected from the group consisting of: a standard network protocol, and a standard database query protocol is received into a ReSTful API. The stateless command calls for data to be processed using a special-purpose processing resource, such as a GPU. In a step 530, the data is processed using the special-purpose processing resource. As stated above, special-purpose processing includes, but it not limited to, graphics processing, math processing, signal processing, encoding/decoding, encryption/decryption and massively parallel processing. Such processing may involve altering or transforming data. Images may be rendered, resized, cropped, recolored, or interpolated or decimated to change their resolution, for example. Logo or face detection may be carried out, images may be classified, metadata or aggregated statistics may be generated regarding images. Video may be encoded, decoded or changed in terms of running length, resolution, frame rate or dimension (e.g., stereoscopic synthesis), for example. Audio may be filtered, time- or pitch-altered, amplified or modified in various ways. Data may be transformed, encrypted (e.g., for subsequent transmission via a Secure Socket Layer, or SSL) or decrypted, for example. Such processing may additionally or alternatively involve data analysis. Images, video, audio and data may be subjected to any number of mathematical (e.g., statistical) analyses designed to elicit characteristics of the data that are often too complex or subtle to be understood without them. The invention encompasses all forms of processing.

In a step 540, the stateless command is responded to with results of the processing. The method ends in an end step 550.

Those skilled in the art to which this application relates will appreciate that other and further additions, deletions, substitutions and modifications may be made to the described embodiments.

What is claimed is:

1. A special-purpose processing system, comprising:
  a special-purpose processing resource including at least one special-purpose processor; and
  a Representational State Transfer application programming interface operable to allow a node of a network to access, over said network, said special-purpose processing resource using stateless commands based on a standard protocol, wherein said Representational State Transfer application programming interface allows said at least one special-purpose processor to accelerate processing of data according to said stateless commands, and said at least one special-purpose processor includes a graphics processing unit.

2. The system as recited in claim 1 wherein said standard protocol is selected from the group consisting of:
  a standard network protocol, and
  a standard database query protocol.

3. The system as recited in claim 2 wherein said standard network protocol is selected from the group consisting of:
  HyperText Transfer Protocol,
  eXtensible Markup Language Simple Object Access Protocol, and
  Remote Procedure Call.

4. The system as recited in claim 2 wherein said standard database query protocol is selected from the group consisting of:
  Structured Query Language,
  Data Base Connectivity, and
  Virtual FileSystem.

5. The system as recited in claim 1 further comprising storage couplable to said special-purpose processing resource and selected from the group consisting of:
  local nonvolatile memory,
  cloud storage, and
  distributed storage.

6. The system as recited in claim 1 wherein said data is selected from the group consisting of:
  an image file,
  a video file, and
  an audio file.

7. The system as recited in claim 1 wherein said system functions as a file server of a distributed file system.

8. A method of carrying out special-purpose processing, comprising:
  receiving a stateless command based on a standard protocol from a node of a network, over said network, into a Representational State Transfer application programming interface, said stateless command calling for data to be processed using a special-purpose processing resource;

allowing, by said Representational State Transfer application programming interface, at least one special-purpose processor included in said special-purpose processing resource to accelerate processing of said data according to said stateless command, wherein said at least one special-purpose processor includes a graphics processing unit; and responding to said stateless command with results of said processing.

9. The method as recited in claim 8 wherein said standard protocol is selected from the group consisting of:
a standard network protocol, and
a standard database query protocol.

10. The method as recited in claim 9 wherein said standard network protocol is selected from the group consisting of:
HyperText Transfer Protocol,
eXtensible Markup Language Simple Object Access Protocol, and
Remote Procedure Call.

11. The method as recited in claim 9 wherein said standard database query protocol is selected from the group consisting of:
Structured Query Language,
Data Base Connectivity, and
Virtual FileSystem.

12. The method as recited in claim 8 further comprising retrieving said data from storage selected from the group consisting of:
local nonvolatile memory,
cloud storage, and
distributed storage.

13. The method as recited in claim 8 wherein said data is selected from
an image file,
a video file, or
an audio file.

14. The method as recited in claim 8 wherein said system functions as a file server of a distributed file system.

15. A graphics processing system, comprising:
a graphics processing unit;
a network interface; and
a central processing unit coupled to said graphics processing unit and said network interface and operable to enable a Representational State Transfer application programming interface for:
receiving a stateless command based on a standard network protocol over a network from a node of said network, and
allowing, by said Representational State Transfer application programming interface, said graphics processing unit to accelerate processing of data in accordance with said stateless command.

16. The graphics processing system as recited in claim 15 wherein said standard network protocol is selected from the group consisting of:
HyperText Transfer Protocol,
eXtensible Markup Language Simple Object Access Protocol, and
Remote Procedure Call.

17. The graphics processing system as recited in claim 15 further comprising storage couplable to said graphics processing unit and selected from the group consisting of:
local nonvolatile memory,
cloud storage, and
distributed storage.

18. The graphics processing system as recited in claim 15 wherein said data is selected from
an image file,
a video file, or
an audio file.

19. The graphics processing system as recited in claim 15 wherein said system functions as a file server of a distributed file system.

20. The graphics processing system as recited in claim 15 wherein said data is an image and said processing includes resizing said image.

* * * * *